United States Patent [19]

Ueno

[11] 4,346,796
[45] Aug. 31, 1982

[54] DRIVE MECHANISM WITH CLUTCH AND BRAKE ASSEMBLIES

[75] Inventor: Kunimitsu Ueno, Hirakata, Japan

[73] Assignee: Kabushiki Kaisha Komatsu Seisakusho, Tokyo, Japan

[21] Appl. No.: 180,894

[22] Filed: Aug. 25, 1980

[51] Int. Cl.³ .................. B60K 41/24; F16D 13/74
[52] U.S. Cl. ........................... 192/18 A; 192/70.12
[58] Field of Search ............... 192/113 B, 12 C, 13 R, 192/18 R, 18 A, 70.12; 188/264 B, 264 D, 264 F

[56] References Cited

U.S. PATENT DOCUMENTS

| | | | |
|---|---|---|---|
| 2,920,732 | 1/1960 | Richards et al. | 192/18 A |
| 3,080,774 | 3/1963 | Nickerson et al. | 192/113 B |
| 3,090,257 | 5/1963 | Schjolin et al. | 192/18 A |
| 3,123,193 | 3/1964 | Marland | 192/113 B |
| 3,938,631 | 2/1976 | Smith | 192/113 B |
| 4,082,156 | 4/1978 | Krolak et al. | 180/9.62 |

Primary Examiner—George H. Krizmanich
Attorney, Agent, or Firm—Armstrong, Nikaido, Marmelstein & Kubovcik

[57] ABSTRACT

A drive mechanism having a clutch assembly and a brake assembly comprising a housing, an input shaft rotatably supported by the housing, an output shaft rotatably mounted relative to the housing through the brake assembly, the clutch assembly being spring-engaged and hydraulically disengaged and the brake assembly being spring-actuated and hydraulically released wherein a fluid passage for lubricant is formed in the input shaft and in the clutch assembly and which fluid passage is open to a mounting surface of annular plates of the clutch assembly for lubricating the annular plates and associated clutch disks and another fluid passage is formed in a stationary section of the brake assembly and is open to a mounting surface of annular plates of the brake assembly for lubricating the annular plates and associated brake disks.

3 Claims, 1 Drawing Figure

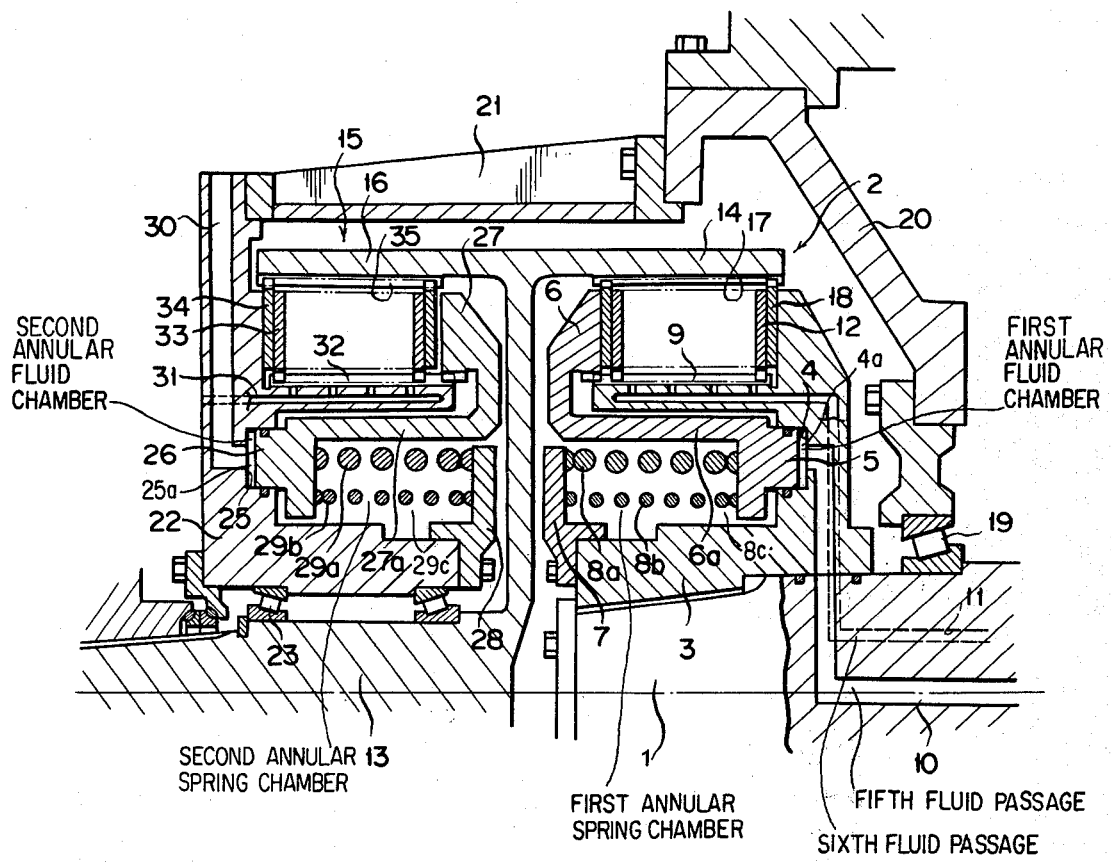

DRIVE MECHANISM WITH CLUTCH AND BRAKE ASSEMBLIES

BACKGROUND OF THE INVENTION

This invention relates to an improved arrangement of a drive mechanism having a wet type clutch assembly and a wet type brake assembly.

Many types of drive mechanism specified above have been known, however, in each of those prior art drive mechanisms a passage for lubricant must be formed through the stationary section and a rotary section for lubricating disks and plates of each assembly.

Therefore, it necessarily requires a plurality of seal rings provided between the stationary section and the rotary section.

SUMMARY OF THE INVENTION

It is therefore an object of the present invention to provide an improved arrangement of a drive mechanism having a clutch assembly and a brake assembly.

Another object of the present invention is to provide a drive mechanism having a clutch assembly and a brake assembly which is capable of providing sufficient lubrication between plates and disks of each assembly by means of a forced lubrication system.

A further object of the present invention is to provide a drive mechanism having a clutch assembly and a brake assembly which requires no seal rings in fluid passages for lubricant by a particular arrangement of the assemblies.

In accordance with an aspect of the present invention, there is provided a drive mechanism having a clutch assembly and a brake assembly, comprising: a housing; an input shaft rotatably supported by said housing; a first inner drum of said clutch assembly fixedly secured to said input shaft, said first inner drum having formed therein a first fluid passage for clutch actuation and a second fluid passage for lubricant; a second inner drum of said brake assembly fixedly secured to said housing, said second inner drum having formed therein a third fluid passage for brake actuation and a fourth fluid passage for lubricant; an output shaft rotatably supported by said second inner drum; a first outer drum of said clutch assembly fixedly connected to said output shaft; a second outer drum of said brake assembly fixedly connected to said output shaft; a first annular retainer plate fixedly secured to said first inner drum; first piston means operatively disposed relative to said first inner drum defining a first annular fluid chamber between one end face thereof and said first inner drum and a first annular spring chamber between said first annular retainer plate, said first inner drum and said first piston means, said first annular fluid chamber being communicated with said first fluid passage, said first piston means having a first annular pusher plate integrally formed therewith; a plurality of first annular plates mounted on an outer peripheral surface of said first inner drum; a plurality of first disks mounted on an inner peripheral surface of said first outer drum, said first annular plates and said first disks being alternately arranged; first spring means disposed in said first spring chamber for biasing said first annular pusher plate toward engaging said first annular plates with said first disks; a second annular retainer plate fixedly secured to said second inner drum; second piston means operatively disposed relative to said second inner drum defining a second annular fluid chamber between one end face thereof and said second inner drum and a second annular spring chamber between said second annular retainer plate, said second inner drum and said second piston means, said second annular fluid chamber being communicated with said third fluid passage, said second piston means having a second annular pusher plate integrally formed therewith; a plurality of second annular plates mounted on an outer peripheral surface of said second inner drum; a plurality of second disks mounted on an inner peripheral surface of said second outer drum, said second annular plates and said second disks being alternately arranged; and second spring means disposed in said second spring chamber for biasing said second annular pusher plate toward engaging said second annular plates with said second disks.

The above and other objects, features and advantages of the present invention will be readily apparent from the following description taken in conjunction with the accompanying drawing.

BRIEF DESCRIPTION OF THE DRAWING

Accompanying drawing is a cross-sectional view of a half section of a drive mechanism according to the present invention.

DESCRIPTION OF THE PREFERRED EMBODIMENT

The present invention will now be described by way of example with reference to the accompanying drawing.

In the drawing, reference numeral 1 denotes an input shaft which is connected to an inner drum 3 of a clutch 2 by means of tapered serrations formed on the two. The inner drum 3 has a cylinder portion 4 formed therein in which a piston 5 is slidably mounted in chamber 4a. The piston 5 comprises a cylindrical portion 6a and a pusher plate 6 formed as an integral part thereof.

Fixedly secured to the inner drum 3 is a retainer 7, and springs 8a and 8b are interposed between the retainer 7 and the piston 5. Further, the inner drum 3 has an outer gear teeth 9 formed on the outer peripheral part thereof.

The input shaft 1 has a clutch actuating fluid passage 10 and a lubricating oil passage formed therein. The clutch actuating fluid passage 10 leads to the cylinder portion 4, whilst the lubricating oil passage 11 extends to open between the outer teeth 9 of the inner drum 3. A plurality of plates 12 are engaged with the outer teeth 9.

Reference numeral 13 denotes an output shaft which is connected to both an outer drum 14 of the clutch 2 and an outer drum 16 of a brake 15, said outer drums 14 and 16 being formed as an integral part of the output shaft 13. The outer drum 14 of the clutch has inner gear teeth 17 formed thereon which engage with a plurality of disks 18, said disks 18 each being interposed between the plates 12.

Reference numeral 20 indicates a housing which rotatably carries the input shaft 1 through a bearing 19. Fitted to the housing 20 through a drum 21 is an inner drum 22 of the brake 15, and the inner drum 22 rotatably carries the output shaft 13 through bearings 23.

The inner drum 22 has a cylinder portion 25 formed therein, in which a piston 26 is slidably mounted in chamber 25a. The piston 26 comprises a cylindrical portion 27a and a pusher plate 27 formed as an integral part thereof. Fixedly secured to the inner drum 22 is a retainer 28, and springs 29a and 29b are interposed between the retainer 28 and the piston 26. Further, the inner drum 22 has a brake actuating fluid passage 30 and a lubricating oil passage 31 formed therein. The brake actuating fluid passage 30 leads to the cylinder portion 25, whilst the lubricating oil passage 31 extends to open between outer gear teeth 32 of the inner drum 22.

A plurality of plates 33 are engaged with the outer gear teeth 32. The outer drum 16 of the brake 15 has inner gear teeth 35 formed inside thereof, which engage with a plurality of disks 34, each of the disks 34 being interposed between the plates 33.

The operation of the apparatus of the present invention will now be described hereinbelow.

The torque of the input shaft 1 is transmitted through the inner drum 3 of the clutch 2, the plates 12, the disks 18 and the outer drum 14 to the output shaft 13.

The transmission of the torque can be cut off by changing over valves to supply hydraulic fluid into the cylinder portion 4 so as to actuate the piston 5 and move the pusher plate 6 against the biasing force of the springs 8a and 8b located in chamber 8c thereby spacing the plates 12 and the disks 18 apart.

Regarding the brake 15, changing over associated valves to drain the brake working fluid exerted on the piston 26 will allow the pusher plate 27 to urge the plates 33 against the disks 34 by the force of the springs 29a and 29b located in chamber 29c. Consequently, the outer drum 16 is locked at a fixed location so as to allow the braking force to be applied on the output shaft 13.

Moreover, since the inner drums 3 and 22 of the clutch 2 and the brake 15 have independent lubricating oil passages 11 and 31 formed therein, respectively, the lubricating oil can be directly supplied into the disks 18 and 34, respectively, without having to use seal rings.

Further, the pusher plates 6 and 27 are connected, respectively, through the cylindrical portions 6a and 27a to the pistons 5 and 26, and the lubricating oil discharged from the passages 11 and 31 which extend to open between the outer gear teeth of the inner drums 3 and 22, respectively, is surrounded by the pusher plates 6 and 27, the cylindrical portions 6a and 27a, the pistons 5 and 26 and the end face of the inner drums 3 and 22, respectively. Therefore, there is no other escape passage for the lubricating oil than the disk sides so that the whole amount of the lubricating oil can be utilized for lubricating the disks 18 and 34.

Since the apparatus of the present invention is arranged and constructed as mentioned hereinabove, the manner of transmission of the torque from the input shaft to the output shaft is much different from those of the conventional systems and it is possible to ensure the adequate lubrication of the disks without having to use seal rings.

It is to be understood that the foregoing description is merely illustrative of a preferred embodiment of the present invention, and that the scope of the invention is not to be limited thereto, but is to be determined by the scope of the appended claims.

What I claim is:

1. A drive mechanism having a clutch assembly and a brake assembly, comprising:
a housing;
an input shaft rotatably supported by said housing;
a first inner drum of said clutch assembly fixedly secured to said input shaft, said first inner drum having formed therein a first fluid passage for clutch actuation and a second fluid passage for lubricant;
a second inner drum of said brake assembly fixedly secured to said housing, said second inner drum having formed therein a third fluid passage for brake actuation and a fourth fluid passage for lubricant;
an output shaft rotatably supported by said second inner drum;
a first outer drum of said clutch assembly fixedly connected to said output shaft;
a second outer drum of said brake assembly fixedly connected to said output shaft;
a first annular retainer plate fixedly secured to said first inner drum;
first piston means operatively disposed relative to said first inner drum defining a first annular fluid chamber between one end face thereof and said first inner drum and a first annular spring chamber between said first annular retainer plate, said first inner drum and said first piston means, said first annular fluid chamber being communicated with said first fluid passage, said first piston means having a first annular pusher plate integrally formed therewith;
a plurality of first annular plates mounted on an outer peripheral surface of said first inner drum;
a plurality of first disks mounted on an inner peripheral surface of said first outer drum, said first annular plates and said first disks being alternately arranged;
first spring means disposed in said first spring chamber for biasing said first annular pusher plate toward engaging said first annular plates with said first disks;
a second annular retainer plate fixedly secured to said second inner drum;
second piston means operatively disposed relative to said second inner drum defining a second annular fluid chamber between one end face thereof and said second inner drum and a second annular spring chamber between said second annular retainer plate, said second inner drum and said second piston means, said second annular fluid chamber being communicated with said third fluid passage, said second piston means having a second annular pusher plate integrally formed therewith;
a plurality of second annular plates mounted on an outer peripheral surface of said second inner drum;
a plurality of second disks mounted on an inner peripheral surface of said second outer drum, said second annular plates and said second disks being alternately arranged; and
second spring means disposed in said second spring chamber for biasing said second annular pusher plate toward engaging said second annular plates with said second disks.

2. A drive mechanism as recited in claim 1 wherein said first outer drum and said second outer drum being integrally formed.

3. A drive mechanism as recited in claim 1 or 2 wherein said input shaft has formed therein fifth and sixth fluid passages, said fifth fluid passage being communicated with said first fluid passage and said sixth fluid passage being communicated with said second fluid passage and wherein said second fluid passage being open to the outer peripheral surface of said first inner drum having said first annular plates mounted thereon and said fourth fluid passage being open to the outer peripheral surface of said second inner drum having said second annular plates mounted thereon.

* * * * *